US011664612B2

(12) United States Patent
Kim (10) Patent No.: US 11,664,612 B2
(45) Date of Patent: May 30, 2023

(54) INTEGRATED NEEDLE-SHAPED GROUND PLATE, METHOD FOR MANUFACTURING SAME AND GROUND UNIT CONSTRUCTION METHOD USING SAME

(71) Applicant: Moon Sik Kim, Chungcheongbuk-do (KR)

(72) Inventor: Moon Sik Kim, Chungcheongbuk-do (KR)

(*) Notice: Subject to any disclaimer, the term of this patent is extended or adjusted under 35 U.S.C. 154(b) by 13 days.

(21) Appl. No.: 17/610,551

(22) PCT Filed: Jul. 1, 2020

(86) PCT No.: PCT/KR2020/008554
§ 371 (c)(1),
(2) Date: Nov. 11, 2021

(87) PCT Pub. No.: WO2021/006530
PCT Pub. Date: Jan. 14, 2021

(65) Prior Publication Data
US 2022/0239020 A1  Jul. 28, 2022

(30) Foreign Application Priority Data

Jul. 11, 2019  (KR) .................. 10-2019-0083881

(51) Int. Cl.
*H01R 4/00* (2006.01)
*H01R 4/66* (2006.01)
*H02G 13/00* (2006.01)

(52) U.S. Cl.
CPC ............... *H01R 4/66* (2013.01); *H02G 13/40* (2013.01)

(58) Field of Classification Search
CPC .................................. H01R 4/66; H02G 13/40
See application file for complete search history.

(56) References Cited

U.S. PATENT DOCUMENTS

| 6,398,596 B1 * | 6/2002 | Malin | H01R 4/42 439/100 |
| 2005/0186387 A1 * | 8/2005 | Gallant | B29C 43/46 264/166 |
| 2016/0329644 A1 * | 11/2016 | Tabata | H01R 4/66 |

FOREIGN PATENT DOCUMENTS

| KR | 200302447 | 1/2003 |
| KR | 1020150089906 | 8/2015 |

* cited by examiner

*Primary Examiner* — Pete T Lee
(74) *Attorney, Agent, or Firm* — IPLA P.A.

(57) ABSTRACT

A plate-shaped ground plate formed from a copper material, the ground plate includes: an outline frame; a plurality of horizontal ribs connecting the left and right inner peripheral surfaces of the outline frame and distanced from one another in the vertical direction; vertical ribs connecting between the outline frame and the horizontal ribs and between the plurality of horizontal ribs, respectively; and needle-shaped protrusions in the form of a branch which protrude outward on the outer peripheral surfaces of the horizontal ribs.

8 Claims, 12 Drawing Sheets

INTEGRATED NEEDLE-SHAPED GROUND PLATE, METHOD FOR MANUFACTURING SAME AND GROUND UNIT CONSTRUCTION METHOD USING SAME

BACKGROUND

The present invention relates to an integrated needle-shaped ground plate, a method for manufacturing the same, and a ground unit construction method using the same.

More particularly, the present invention relates to an integrated needle-shaped ground plate, which has a plurality of branch type needle-shaped protrusions formed by perforating a copper plate, a method for manufacturing the same, and a ground unit construction method using the same, thereby providing excellent ground characteristics by improving conductivity, and providing convenience in manufacturing and construction since being in an integrated form.

Electric and electronic devices respectively have ground systems in order to prevent damages of the devices caused by inflow of high voltage current due to fault current or thunderstroke.

Such a ground system is installed in such a way that a ground member is buried under the ground and is connected to an electronic device to discharge electricity. Such a member is mainly formed in a plate shape or a bar shape in order to easily connect members with each other.

Furthermore, the ground member is formed such that a subsidiary steel material is embedded by conductive concrete in which cement, inorganic fillers, reactive adjuster, conductive carbon fiber are mixed. The ground member has an adapter for connection so as to connect a plurality of members with one another or to be connected to an electric device or an electronic device.

However, a conventional ground member made with conductive concrete is excellent at discharge effect, but has disadvantages in that it is very heavy and in that it is economically infeasible due to an increase of construction costs since work is delayed while the plurality of ground members are connected with one another.

In order to solve the disadvantages, ground members using lightweight aggregate have been disposed, but the lightweight aggregate has a problem in that strength of the final concrete-hardened body is deteriorated since the lightweight aggregate is very absorbent and increases a mixed amount of water during a concrete mixing process.

Moreover, the ground member in which carbon fiber has the advantage of improving ground performance, but has a disadvantage in that expenses increase when the plurality of ground members are constructed since being expensive.

Patent Document 0001: Korean Utility Model Registration No. 20-0302447 (Jan. 14, 2003)

Patent Document 0002: Korean Patent No. 10-1597354 (Feb. 18, 2016)

SUMMARY OF THE INVENTION

Accordingly, the present invention has been made to solve the above-mentioned problems occurring in the prior arts, and it is an object of the present invention to provide an integrated needle-shaped ground plate, which has a plurality of branch type needle-shaped protrusions formed by perforating a copper plate, a method for manufacturing the same, and a ground unit construction method using the same, thereby providing excellent ground characteristics by improving conductivity, and providing convenience in manufacturing and construction since being in an integrated form.

To accomplish the above object, according to the present invention, there is provided an integrated needle-shaped ground plate formed with a copper material, the ground plate including: an outline frame; a plurality of horizontal ribs connecting the left and right inner peripheral surfaces of the outline frame and spaced apart from one another in the vertical direction; vertical ribs connecting between the outline frame and the horizontal ribs and between the plurality of horizontal ribs, respectively; and branch type needle-shaped protrusions which protrude outwards on the outer peripheral surfaces of the horizontal ribs.

In another aspect of the present invention, there is provided a method for manufacturing an integrated needle-shaped ground plate including: a preparation step of preparing a plate-shaped member by molding a copper material: a perforation step of perforating the plate-shaped member using a perforating device to form an outline frame and through holes; and a boring step of forming one or more adapter holes in the front, rear, right and left sides of the outline frame, wherein in the perforation step, a plurality of horizontal ribs connecting the left and right inner peripheral surfaces of the outline frame are formed to be spaced apart from one another, a plurality of vertical ribs connecting between the outline frame and the horizontal ribs and between the plurality of horizontal ribs are formed, and branch type needle-shaped protrusions are formed on the outer peripheral surfaces of the horizontal ribs to protrude outwards.

Additionally, in a further aspect of the present invention, there is provided a ground unit construction method using an integrated needle-shaped ground plate including: an excavation step of excavating the ground so that the ground has a cross section of which the lower side gets narrower and the upper side gets wider; and a laying step of laying ground plates on three sides of the excavated space.

According to the present invention, the integrated needle-shaped ground plate can provide excellent ground characteristics by improving conductivity and provide convenience in manufacturing and construction since being in an integrated form.

Moreover, the ground plate has adapter holes formed in the front, rear, left and right sides thereof, and a bare copper wire is connected to the adapter holes so that the plurality of ground plates are constructed to be spaced apart from one another. Therefore, the ground plates with improved ground characteristics can be constructed over a wide area.

Furthermore, the present invention can be constructed easily since the plurality of ground plates are spaced apart from one another and bare cooper wire is connected into the adapter holes of the ground plates.

In addition, because the ground plate 100 is perforated to form the through holes, when the ground plate 100 is laid under the ground, earth and sand flow into the through holes, so that a bonded surface area between the ground plate and the ground gets wider and grounded effect is maximized since bonding strength is maintained according to the terrain change.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Advantages and features of the present invention, and method to achieve them of the present invention will be obvious with reference to embodiments along with the accompanying drawings which are described below. Meanwhile, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the detailed description, the same reference numbers of the drawings refer to the same or equivalent parts of the present invention.

In description of embodiments of the present invention, in a case where it is determined that detailed description of well-known functions and configurations according to the present disclosure may unnecessarily obscure the gist of the present disclosure, the detailed description will be omitted. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Therefore, configurations described in exemplary embodiments and the accompanying drawings of the present invention do not represent all of the technical spirits of the present invention, but are merely most preferable embodiments. Therefore, the present invention should be construed as including all the changes, equivalents, and substitutions included in the spirit and scope of the present invention at the time of filing this application.

Before exemplary embodiments of the present invention will be described in detail with reference to the accompanying drawings, it is noted that the expressions and phrases used for the terms indicating directions of an apparatus or factor (e.g., "front," "back," "up," "down," "top," "bottom," "left," "right," "lateral," etc.) are merely used to simplify the description of the present invention, and it can be noted that it does not mean that the related components simply have specific directions.

The present invention relates to an integrated needle-shaped ground plate, which has a plurality of branch type needle-shaped protrusions formed by perforating a copper plate, a method for manufacturing the same, and a ground unit construction method using the same, thereby providing excellent ground characteristics by improving conductivity, and providing convenience in manufacturing and construction since being in an integrated form.

Hereinafter, with reference to the attached drawings, an integrated needle-shaped ground plate according to an embodiment of the present invention will be described in detail.

Figure 1:
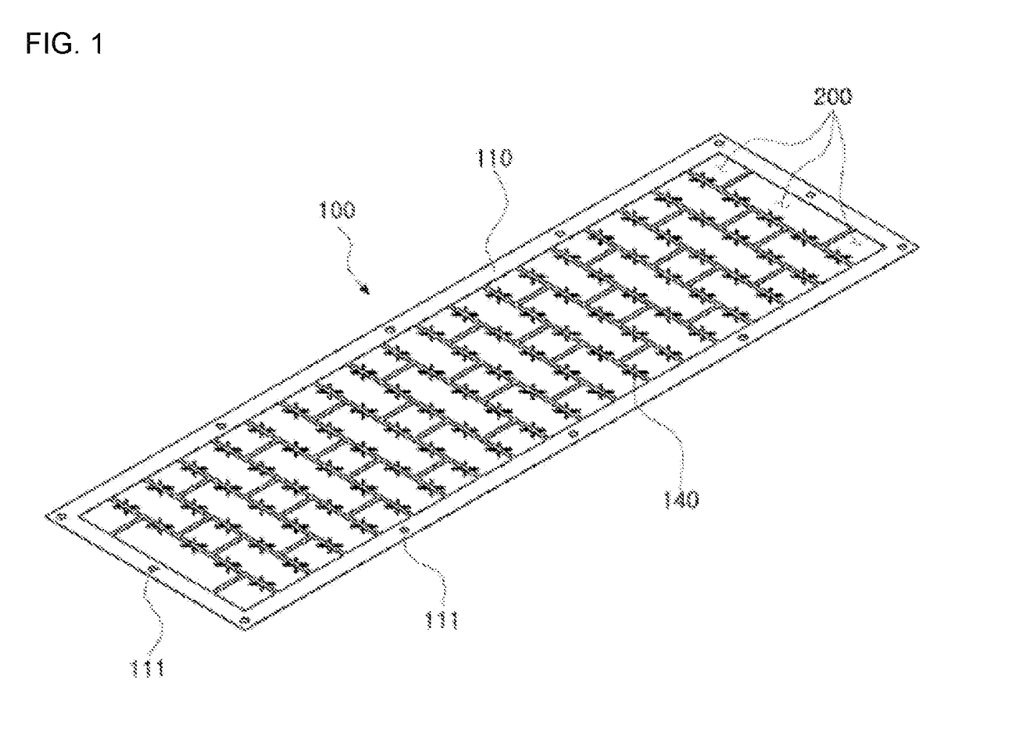
FIG. 1 is a perspective view illustrating an integrated needle-shaped ground plate according to an embodiment of the present invention.
Figure 2:
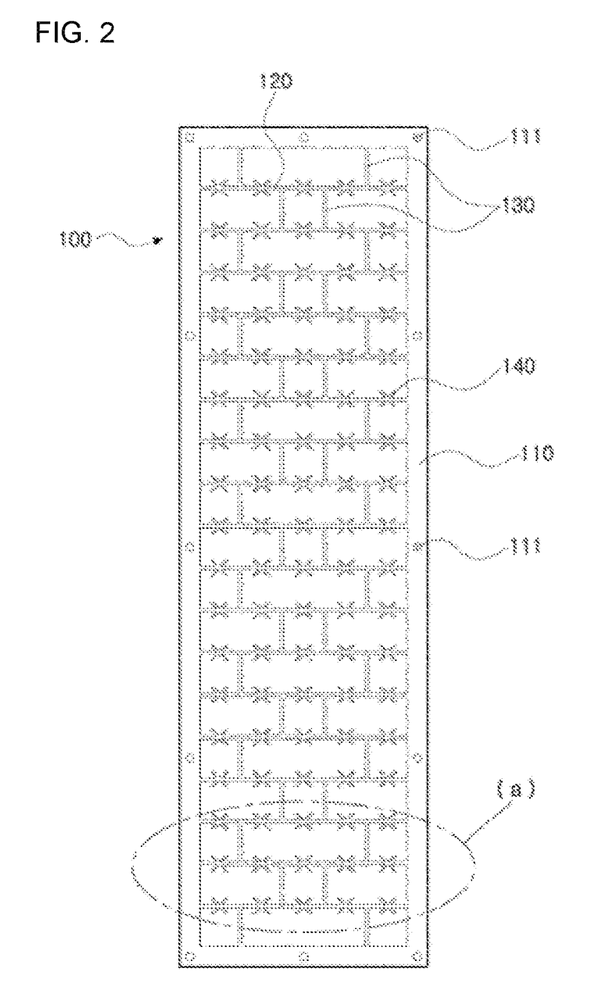
FIG. 2 is a plan view illustrating the integrated needle-shaped ground plate according to the present invention.
Figure 3:
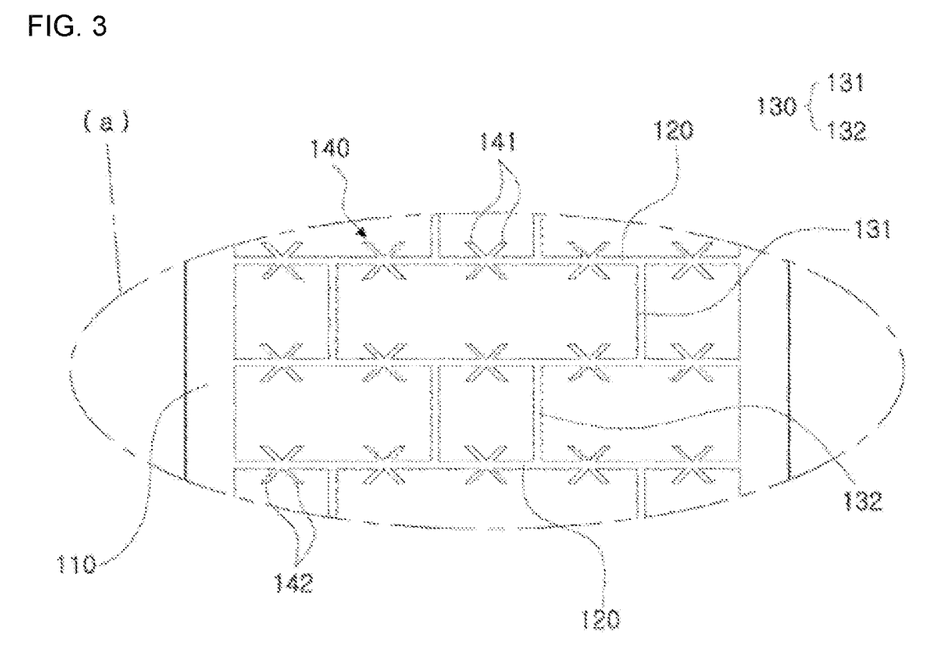
FIG. 3 is a partially enlarged view illustrating a needle-shaped protrusion of the integrated needle-shaped ground plate.

FIG. 1 is a perspective view illustrating an integrated needle-shaped ground plate according to an embodiment of the present invention, FIG. 2 is a plan view illustrating the integrated needle-shaped ground plate according to the present invention, and FIG. 3 is a partially enlarged view illustrating a needle-shaped protrusion of the integrated needle-shaped ground plate.

The integrated needle-shaped ground plate 100 is a plate made of a copper material, and has through holes 200 perforated in the copper plate. The ground plate 100 includes an outline frame 110, horizontal ribs 120, vertical ribs 130, and needle-shaped protrusions 140.

Such ground plates 100 are connected to various electric and electronic devices, such as electric power facilities, communication facilities, computers, lightning protection systems, and electric protection facilities by ground wires (bare copper wires), and are laid under the ground, in order to prevent damages of the electric and electronic devices caused by inflow of high voltage current due to fault current or thunderstroke.

That is, ground current flows from grounded equipment into the ground through the ground wires (bare copper wires), the ground plates 100, and the needle-shaped protrusions 140 formed on the ground plates 100.

In this instance, grounding resistance is an index indicating a bad connection in underground earthing, and connection in underground earthing becomes good as grounding resistance gets lower.

As illustrated in FIGS. 1 and 2, the outline frame 110 means an edge of the ground plate 100, and is formed in a rectangular shape.

Preferably, the outline frame 110 has one or more adapter holes 111 formed at front, rear, left and right sides.

The adapter holes 111 are formed to connect bare copper wires, and are formed to vertically penetrate the outline frame 110.

That is, the adapter holes 111 serve as terminals for connecting the bare copper wires to the ground plate 100.

Referring to FIGS. 1 and 2, a plurality of the horizontal ribs 120 connect inner peripheral surfaces of the left side and the right side of the outline frame 110, and are disposed to be space apart from one another in the vertical direction.

Each of the horizontal ribs 120 has the needle-shaped protrusions 140 which will be described later.

The vertical ribs 130 are configured to be connected between the outline frame 110 and the horizontal ribs 120 and between the plurality of horizontal ribs 120. That is, the vertical ribs 130 can prevent the horizontal ribs 120 from being bent or damaged since the horizontal ribs 120 firmly maintain the form by being connected with each other by the vertical ribs 130.

As illustrated in FIGS. 1 and 2, the vertical ribs 130 are disposed between the outline frame 110 and the horizontal ribs 120 and between the plurality of horizontal ribs 120 in pairs.

In detail, exterior vertical ribs 131 and interior vertical ribs 132 are repeatedly disposed in the vertical direction of the ground plate 100 in order.

The exterior vertical ribs 131 are formed in such a way that an interval between a pair of the vertical ribs 130 is wide and an interval between the outline frame 110 and the vertical rib 130 is narrow. Depending on design conditions, an interval between a pair of the exterior vertical ribs 131 is equal to the length of the vertical rib 130.

The interior vertical ribs 130 are formed in such a way that an interval between a pair of the vertical ribs 130 is narrow and an interval between the outline frame 110 and the vertical rib 130 is wide. Depending on design conditions, an interval between the outline frame 110 and the vertical rib 130 is equal to the length of the vertical rib 130.

Because the interior vertical ribs 132 and the exterior vertical ribs 131 having different intervals are arranged in the longitudinal direction of the ground plate 100 in order, the horizontal ribs 120 can firmly maintain the form.

Furthermore, because the plurality of vertical ribs 130 and the plurality of horizontal ribs 120 are spaced apart from one another and are disposed on the inner face of the outline frame 110, as illustrated in FIGS. 1 and 2, a plurality of through holes 200 are formed by the outline frame 110, the vertical ribs 130, and the horizontal ribs 120.

That is, because a plate made of a copper material is perforated to form the through holes 200, the outline frame 110, the vertical ribs 130, the horizontal ribs 120, and the needle-shaped protrusions 140 of the ground plate 100 are formed integrally.

The needle-shaped protrusion 140 is formed to protrude outwards on the outer peripheral surface of the horizontal rib 120 in a branch form. The needle-shaped protrusion 140 includes a pair of first protrusions 141 and a pair of second protrusions 142 respectively protruding outwards on the front side and the rear side of the horizontal rib 120 so as to form an "X" shape as illustrated in FIG. 3.

On other words, a pair of the first protrusions 141 and a pair of the second protrusions 142 are formed in such a way that an interval between the first protrusions 141 and an interval between the second protrusions 142 become wider as getting away from the horizontal rib 120, so that the needle-shaped protrusions 140 form an "X" shape.

As illustrated in the drawings, because the plurality of needle-shaped protrusions 140 are formed on the ground plate 100, ground current can be emitted under the ground smoothly so as to protect electric and electronic devices from an overcurrent and an overvoltage.

It is illustrated that the needle-shaped protrusions 140 are formed in the "X" shape, but depending on design conditions, one or more first protrusions 141 and the second protrusions 142 may protrude outwards.

For instance, the first protrusions 141 and the second protrusions 142 are respectively in pairs, but one or three protrusions may be formed.

Meanwhile, as illustrated in FIGS. 1 to 3, it is illustrated that the needle-shaped protrusions 140 are formed in a plate shape like the ground plate 100, but as illustrated in FIGS. 4 to 13, the needle-shaped protrusions 140 may be bent and protrude upwards or downwards from the ground plate 100.

Referring to FIGS. 4 to 13, various embodiments of the needle-shaped protrusions 140 will be described.

Figure 4:
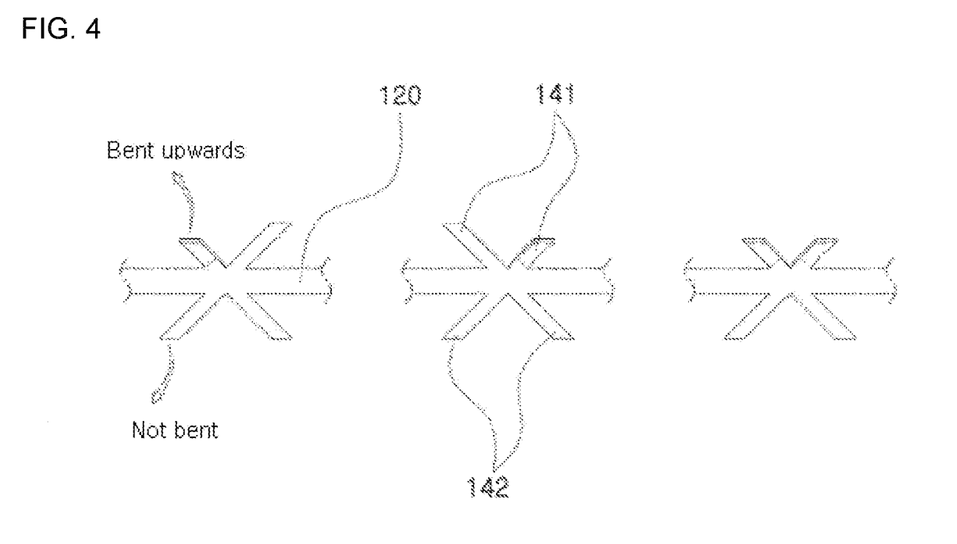
FIG. 4 is a partially enlarged view illustrating a needle-shaped protrusion of an integrated needle-shaped ground plate according to a first embodiment of the present invention.
Figure 5:
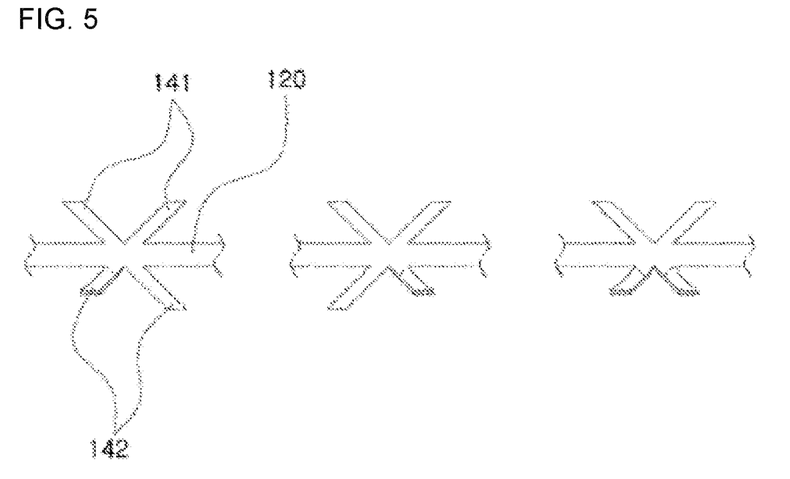
FIG. 5 is a partially enlarged view illustrating a needle-shaped protrusion of an integrated needle-shaped ground plate according to a second embodiment of the present invention.
Figure 6:
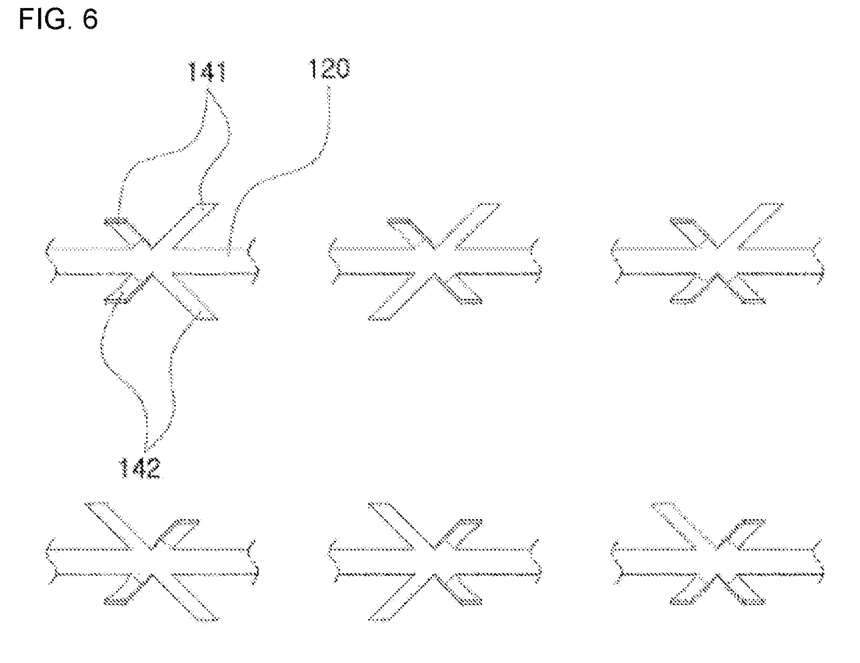
FIG. 6 is a partially enlarged view illustrating a needle-shaped protrusion of an integrated needle-shaped ground plate according to a third embodiment of the present invention.
Figure 7:
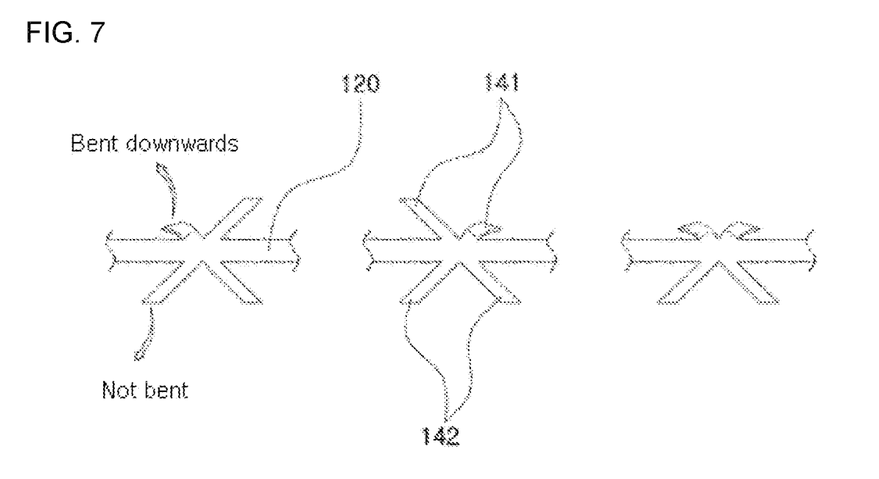
FIG. 7 is a partially enlarged view illustrating a needle-shaped protrusion of an integrated needle-shaped ground plate according to a fourth embodiment of the present invention.
Figure 8:
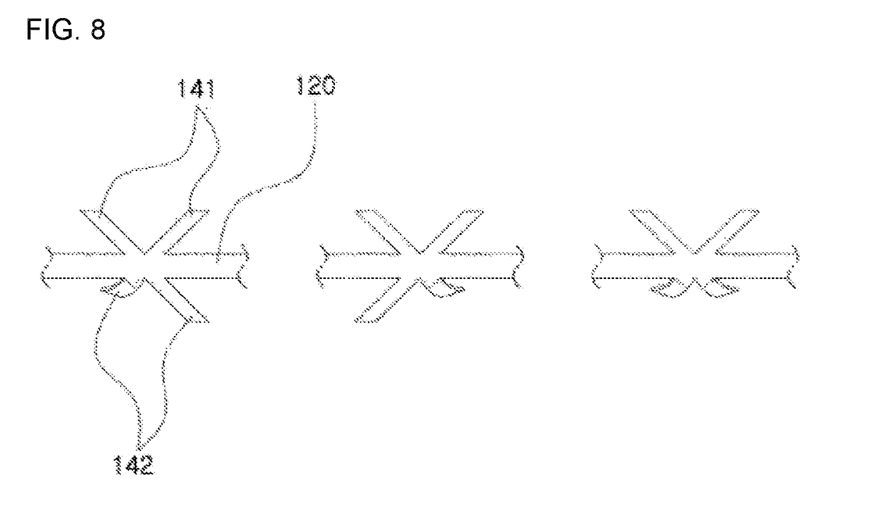
FIG. 8 is a partially enlarged view illustrating a needle-shaped protrusion of an integrated needle-shaped ground plate according to a fifth embodiment of the present invention.
Figure 9:
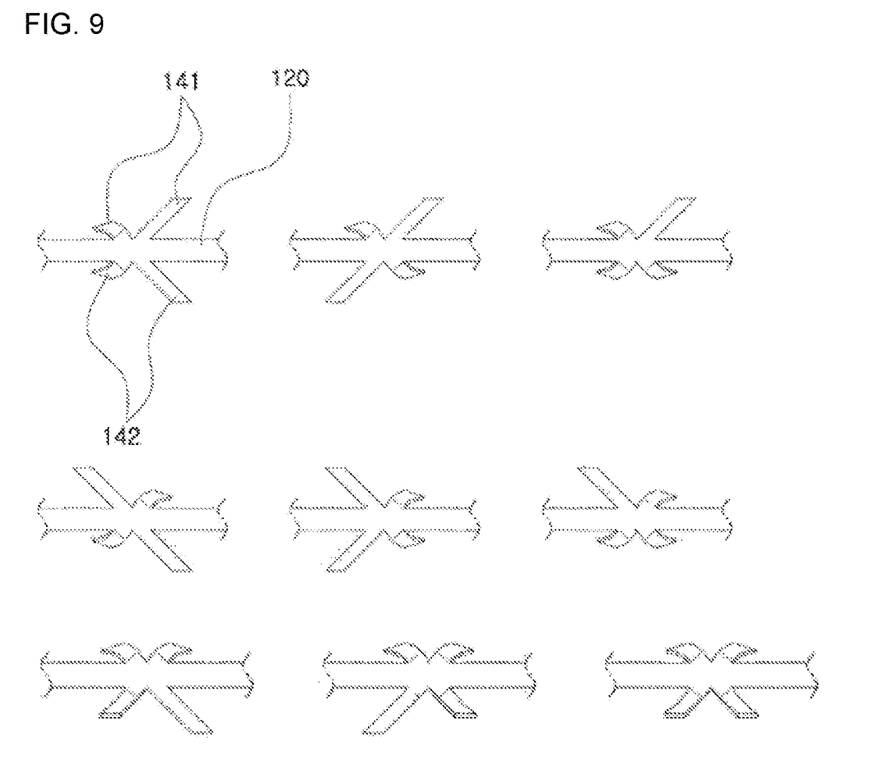
FIG. 9 is a partially enlarged view illustrating a needle-shaped protrusion of an integrated needle-shaped ground plate according to a sixth embodiment of the present invention.
Figure 10:
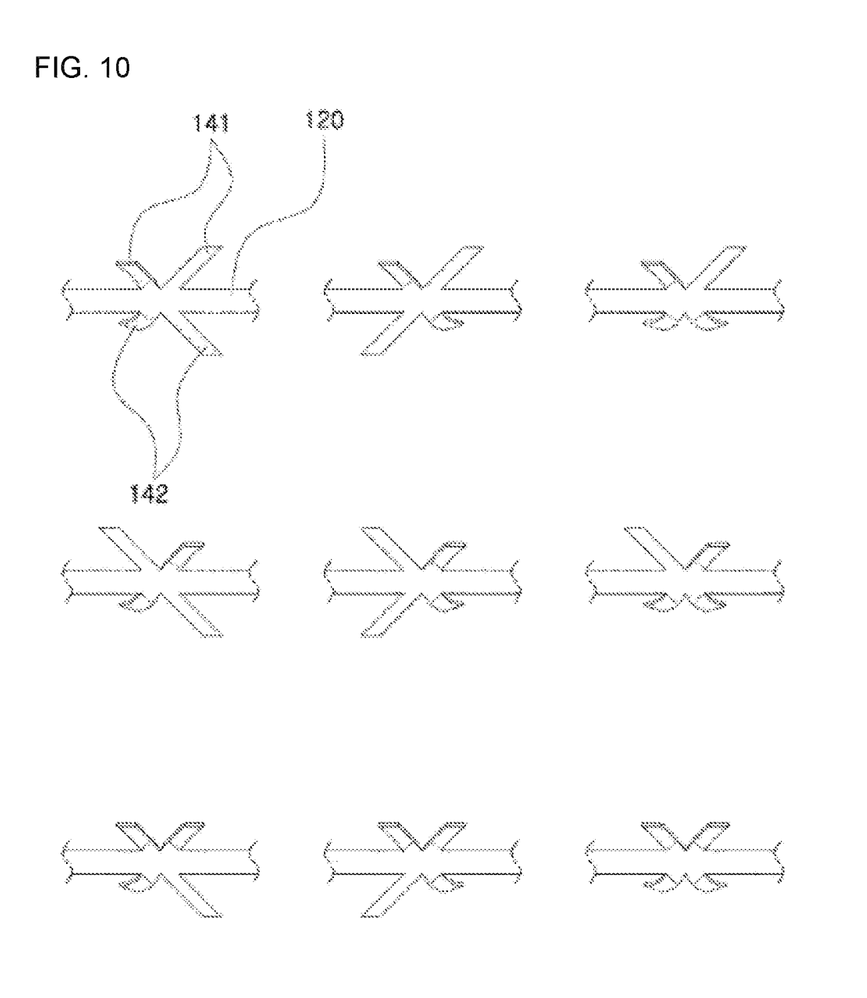
FIG. 10 is a partially enlarged view illustrating a needle-shaped protrusion of an integrated needle-shaped ground plate according to a seventh embodiment of the present invention.
Figure 11:
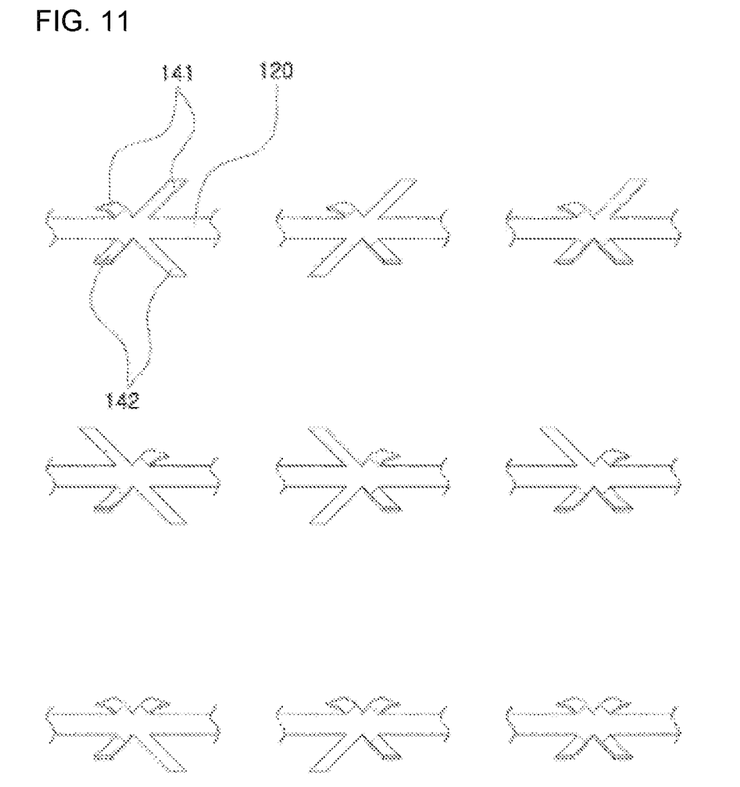
FIG. 11 is a partially enlarged view illustrating a needle-shaped protrusion of an integrated needle-shaped ground plate according to an eighth embodiment of the present invention.
Figure 12:
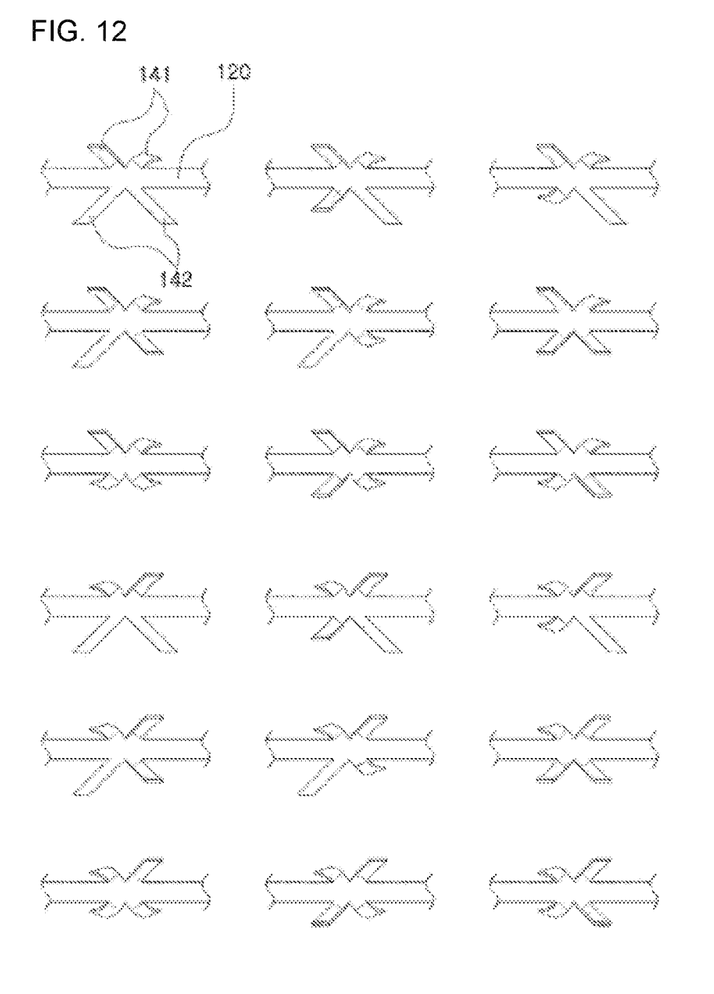
FIG. 12 is a partially enlarged view illustrating a needle-shaped protrusion of an integrated needle-shaped ground plate according to a ninth embodiment of the present invention.
Figure 13:
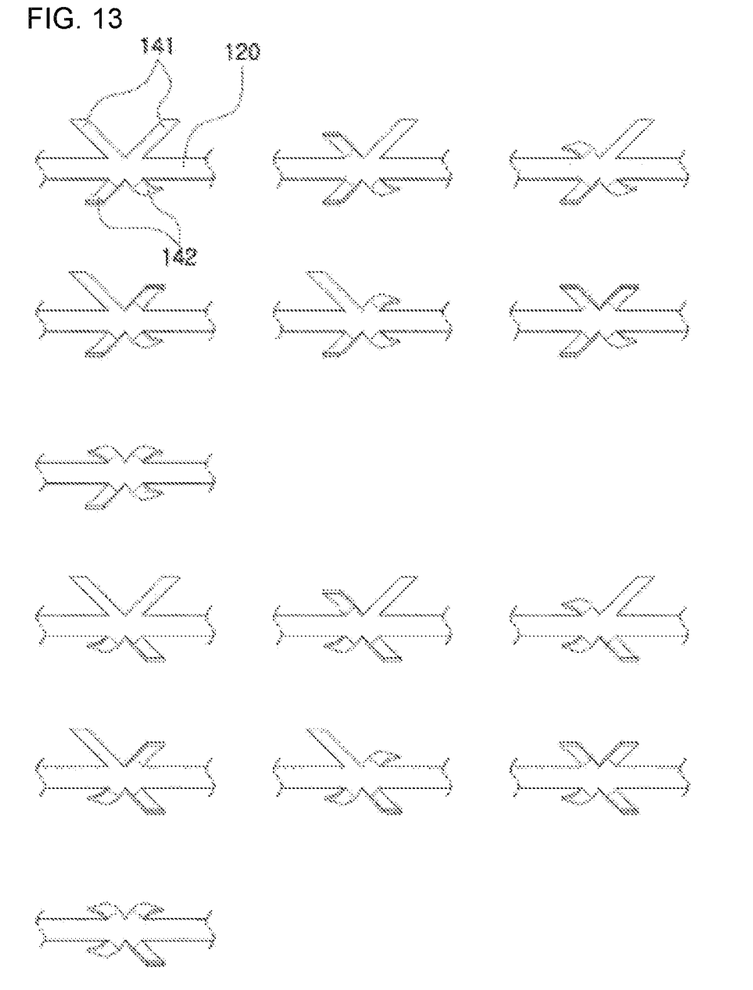
FIG. 13 is a partially enlarged view illustrating a needle-shaped protrusion of an integrated needle-shaped ground plate according to a tenth embodiment of the present invention.

FIG. 4 is a partially enlarged view illustrating a needle-shaped protrusion of an integrated needle-shaped ground plate according to a first embodiment of the present invention, FIG. 5 is a partially enlarged view illustrating a needle-shaped protrusion of an integrated needle-shaped ground plate according to a second embodiment of the present invention, FIG. 6 is a partially enlarged view illustrating a needle-shaped protrusion of an integrated needle-shaped ground plate according to a third embodiment of the present invention, FIG. 7 is a partially enlarged view illustrating a needle-shaped protrusion of an integrated needle-shaped ground plate according to a fourth embodiment of the present invention, FIG. 8 is a partially enlarged view illustrating a needle-shaped protrusion of an integrated needle-shaped ground plate according to a fifth embodiment of the present invention, FIG. 9 is a partially enlarged view illustrating a needle-shaped protrusion of an integrated needle-shaped ground plate according to a sixth embodiment of the present invention, FIG. 10 is a partially enlarged view illustrating a needle-shaped protrusion of an integrated needle-shaped ground plate according to a seventh embodiment of the present invention, FIG. 11 is a partially enlarged view illustrating a needle-shaped protrusion of an integrated needle-shaped ground plate according to an eighth embodiment of the present invention, FIG. 12 is a partially enlarged view illustrating a needle-shaped protrusion of an integrated needle-shaped ground plate according to a ninth embodiment of the present invention, and FIG. 13 is a partially enlarged view illustrating a needle-shaped protrusion of an integrated needle-shaped ground plate according to a tenth embodiment of the present invention.

First, FIG. 4 illustrates a needle-shaped protrusion 140 according to the first embodiment. In the first embodiment, at least one selected from a pair of first protrusions 141 is bent upwards from the ground plate 100 to protrude upwards.

Moreover, FIG. 5 illustrates a needle-shaped protrusion 140 according to the second embodiment. In the second embodiment, at least one selected from a pair of second protrusions 142 is bent upwards from the ground plate 100 to protrude upwards.

Furthermore, FIG. 6 illustrates a needle-shaped protrusion 140 according to the third embodiment. In the third embodiment, at least one selected from a pair of first protrusions 141 and at least one selected from a pair of second protrusions 142 are bent upwards from the ground plate 100 to protrude upwards.

Additionally, FIG. 7 illustrates a needle-shaped protrusion 140 according to the fourth embodiment. In the fourth embodiment, at least one selected from a pair of first protrusions 141 is bent downwards from the ground plate 100 to protrude downwards.

Moreover, FIG. 8 illustrates a needle-shaped protrusion 140 according to the fifth embodiment. In the fifth embodiment, at least one selected from a pair of second protrusions 142 is bent downwards from the ground plate 100 to protrude downwards.

Furthermore, FIG. 9 illustrates a needle-shaped protrusion 140 according to the sixth embodiment. In the sixth embodiment, at least one selected from a pair of first protrusions 141 and at least one selected from a pair of second protrusions 142 are bent downwards from the ground plate 100 to protrude downwards.

Additionally, FIG. 10 illustrates a needle-shaped protrusion 140 according to the seventh embodiment. In the seventh embodiment, at least one selected from a pair of first protrusions 141 is bent upwards from the ground plate 100 to protrude upwards, and at least one selected from a pair of second protrusions 142 is bent downwards from the ground plate 100 to protrude downwards.

In addition, FIG. 11 illustrates a needle-shaped protrusion 140 according to the eighth embodiment. In the eighth embodiment, at least one selected from a pair of first protrusions 141 is bent downwards from the ground plate 100 to protrude downwards, and at least one selected from a pair of second protrusions 142 is bent upwards from the ground plate 100 to protrude upwards.

Moreover, FIG. 12 illustrates a needle-shaped protrusion 140 according to the ninth embodiment. In the ninth embodiment, a pair of first protrusions 141 are respectively bent and protrude upwards and downwards to correspond to each other, and at least one selected from a pair of second protrusions 142 is bent upwards or downwards from the ground plate 100 to protrude upwards or downwards.

Furthermore, FIG. 13 illustrates a needle-shaped protrusion 140 according to the tenth embodiment. In the tenth embodiment, a pair of second protrusions 142 are respectively bent and protrude upwards and downwards to correspond to each other, and at least one selected from a pair of first protrusions 142 is bent upwards or downwards from the ground plate 100 to protrude upwards or downwards.

As described above, as illustrated in FIGS. 4 to 13, the needle-shaped protrusions 140 having the first protrusions 141 and the second protrusions 142 are bent and protrude upwards or downwards from the ground plate 100, so that directions of ends of the needle-shaped protrusions 140 can be adjusted freely.

In the case that the ground plate 100 is laid under the ground, a direction that ground current flows under the ground in the direction that the needle-shaped protrusions 140 are headed can be adjusted selectively.

Figure 14:
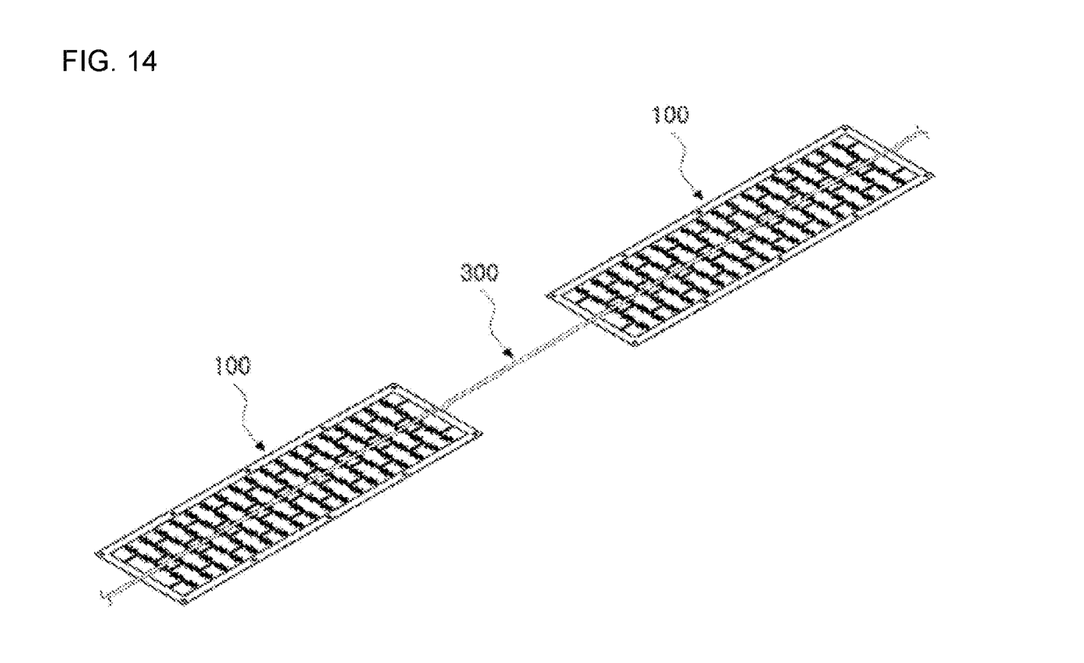
FIG. 14 is a view illustrating an example that a plurality of integrated needle-shaped ground plates according to the present invention are connected by a bare copper wire.

FIG. 14 is a view illustrating an example that a plurality of integrated needle-shaped ground plates according to the present invention are connected by a bare copper wire.

Depending on design conditions, in the case that the plurality of ground plates 100 are constructed, as illustrated in FIG. 14, the plurality of ground plate 100 are spaced apart from one another at predetermined intervals and are laid under the ground. The bare copper wire 300 is disposed in a heading direction of the plurality of ground plates 100.

The bare copper wire 300 is located at the upper end of the plurality of ground plates 100, and is fixed in adapter holes 111 of the ground plates 100 so that the plurality of ground plates 100 are connected with one another.

The integrated needle-shaped ground plate according to the present invention can improve conductivity and provide excellent ground characteristics since the plurality of branch type needle-shaped protrusions are formed by perforating the copper plate.

Additionally, because the ground plate has the outline frame 110, the horizontal ribs 120, the vertical ribs 130, and the needle-shaped protrusions 140 which are formed integrally, the integrated needle-shaped ground plate according to the present invention can prevent the problem of the conventional mesh-type ground plate that a welded part comes off and grounding is not achieved while electric current flows when a mesh type ground electrode wire is welded and connected to an outline frame.

In addition, because the ground plate 100 is perforated to form the through holes 200, when the ground plate 100 is laid under the ground, earth and sand flow into the through holes 200, so that a bonded surface area between the ground plate 100 and the ground gets wider and grounded effect is maximized since bonding strength is maintained according to the terrain change.

Moreover, the ground plate has adapter holes 111 formed in the front, rear, left and right sides thereof, and a bare copper wire is connected to the adapter holes 111 so that the plurality of ground plates 100 are constructed to be spaced apart from one another. Therefore, the ground plates with improved ground characteristics can be constructed over a wide area. That is, because the plurality of ground plates 100 are connected through the adapter holes 111, the plurality of ground plates 100 can be constructed in a parallel structure or a series structure so as to provide excellent availability.

Hereinafter, referring to FIG. 15, a manufacturing method of the integrated needle-shaped ground plate according to the present invention will be described.

Repeated descriptions of the contents illustrated in FIGS. 1 to 14 will be omitted.

Figure 15:
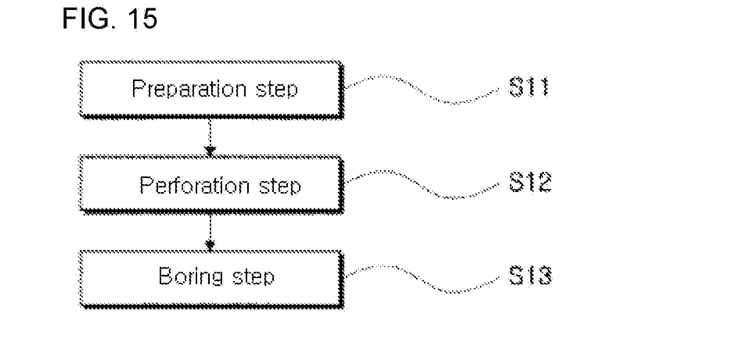
FIG. 15 is a flow chart of a manufacturing method of the integrated needle-shaped ground plate.

FIG. 15 is a flow chart of a manufacturing method of the integrated needle-shaped ground plate.

The manufacturing method of the integrated needle-shaped ground plate according to the present invention includes a preparation step (S11), a perforation step (S12), and a boring step (S13).

The preparation step (S11) is a step of preparing a plate-shaped member by molding a copper material.

In this instance, the member is as big as one ground plate 100 to be manufactured, and preferably, has a length of the outer peripheral surface which is the same as the outer peripheral surface of the outline frame 110.

The plate-shaped member is prepared in the preparation step (S11), and the through holes 200 are formed in the plate-shaped member in the perforation step (S12), so that an integrated needle-shaped ground plate 100 can be manufactured.

The perforation step (S12) is a step of perforating the plate-shaped member using a perforating device.

Through the above steps, the outline frame 110 and the plurality of through holes 200 are formed. So, when the ground plate 100 is laid under the ground, earth and sand are introduced through the through holes 200.

In this instance, in the perforation step (S12), the plurality of horizontal ribs 120 for connecting the inner peripheral surfaces of the left side and the right of the outline frame 110 are formed to be spaced apart from each other, and vertical ribs 130 connected between the outline frame 110 and the horizontal ribs 120 and between the plurality of horizontal ribs 120 are formed. So, the branch-type needle-shaped protrusions 140 which protrude outwards from the outer peripheral surfaces of the horizontal ribs 120 are formed by perforation.

The plurality of needle-shaped protrusions 140 are formed to induce that ground current flows into the ground through the needle-shaped protrusions 140. So, the present invention enhances ground performance.

The boring step (S13) is a step of forming one or more adapter holes 111 in the front, rear, right and left sides of the outline frame 110.

In the boring step (S13), the adapter holes 111 which vertically penetrate the ground plate 100 are formed by a boring device.

Depending on design conditions, the perforation step (S12) and the boring step (S13) are carried out in order or at the same time.

As described above, because the ground plate has the outline frame 110, the horizontal ribs 120, the vertical ribs 130, and the needle-shaped protrusions 140 which are formed integrally, the integrated needle-shaped ground plate according to the present invention can prevent the problem of the conventional mesh-type ground plate that a welded part comes off and grounding is not achieved while electric current flows when a mesh type ground electrode wire is welded and connected to an outline frame.

That is, because the horizontal ribs 120, the vertical ribs 130 and the needle-shaped protrusions 140 come off the outline frame 110, ground current smoothly flows into the ground by the plurality of needle-shaped protrusions 140. So, the integrated needle-shaped ground plate 100 according to the present invention can provide excellent ground effect.

Hereinafter, referring to FIGS. 16 to 18, a ground unit construction method using the integrated needle-shaped ground plate according to the present invention will be described.

Repeated descriptions of the contents illustrated in FIGS. 1 to 15 will be omitted.

Figure 16:
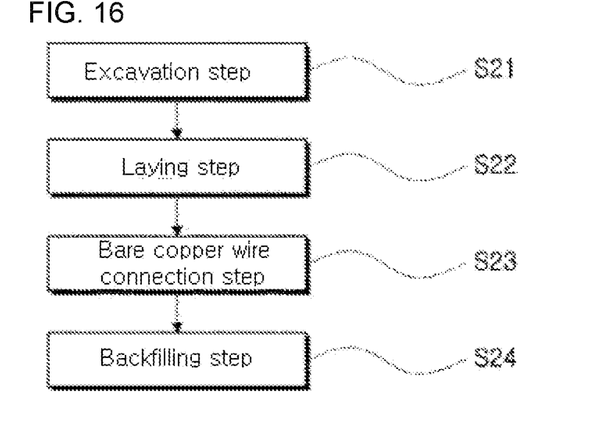
FIG. 16 is a flow chart illustrating a ground unit construction method using the integrated needle-shaped ground plate according to the present invention.
Figure 17:
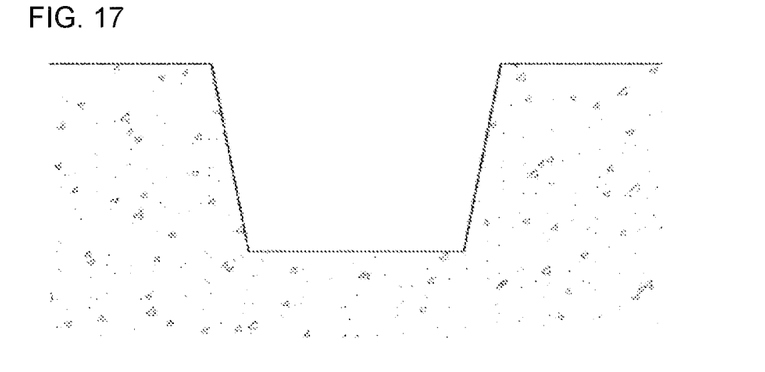
FIG. 17 is a view illustrating an excavation step of the ground unit construction method using the integrated needle-shaped ground plate according to the present invention.
Figure 18:
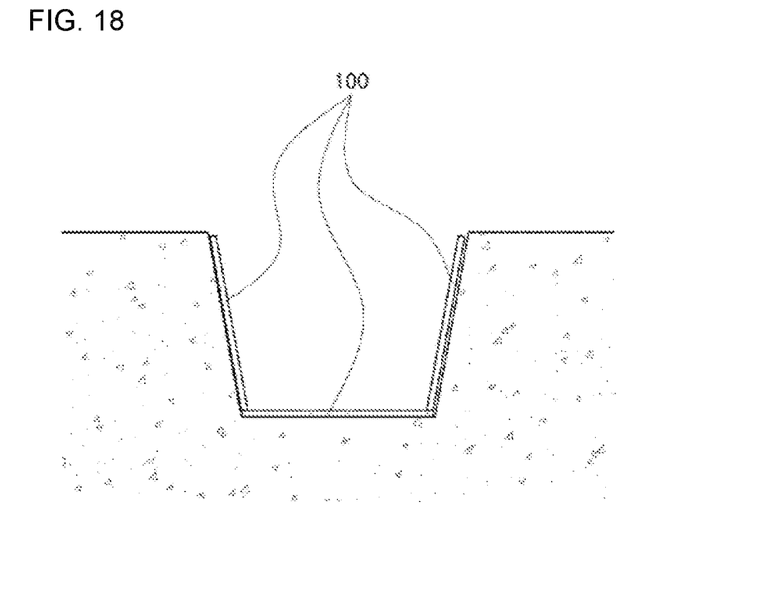
FIG. 18 is a view illustrating a laying step of the ground unit construction method using the integrated needle-shaped ground plate according to the present invention.

FIG. 16 is a flow chart illustrating a ground unit construction method using the integrated needle-shaped ground plate according to the present invention, FIG. 17 is a view illustrating an excavation step of the ground unit construction method using the integrated needle-shaped ground plate according to the present invention, FIG. 18 is a view illustrating a laying step of the ground unit construction method using the integrated needle-shaped ground plate according to the present invention.

The ground unit construction method using the integrated needle-shaped ground plate according to the present invention relates to a method of laying the ground plate 100 illustrated in FIGS. 1 to 15 under the ground, and includes an excavation step (S21), a laying step (S22), a bare copper wire connection step (S23), and a backfilling step (S24).

The excavation step (S21) is a step of excavating the ground, and is to prepare a space for laying the ground plate 100 under the ground.

In this instance, as illustrated in FIG. 17, in the excavation step (S21), the ground is excavated to have a cross section of which the lower side gets narrower and the upper side gets wider.

The laying step (S22) is a step of laying the ground plate 100 in the space excavated in the excavation step (S21).

In this instance, in the laying step (S22), the plurality of ground plates 100 may be laid and constructed in the longitudinal direction as illustrated in FIG. 14. However, as illustrated in FIG. 18, in the case that the inner peripheral surface of the excavated space has three sides, the ground plates 100 may be respectively laid and constructed on the three sides.

In this instance, the ground plates 100 are connected with the bare copper wires.

As described above, the case that the ground plates 100 are laid on the three sides can be utilized in places where do not have a sufficient space for excavation according to the ground state or the quality of soil.

For an example, in the case that a space for excavation in which the plurality of ground plates 100 will be constructed is very narrow, as illustrated in FIG. 18, because the ground plates 100 are constructed on the three sides of the excavated space, the excavated space can be utilized well, and the present invention can provide excellent ground effect even in the narrow space.

The bare copper wire connection step (S23) is a step of connecting the plurality of ground plates 100 laid in the laying step (S22) by the bare copper wire 300.

Referring to FIG. 14, the bare copper wire connection step (S23) will be described. The plurality of ground plates 100 are constructed to be spaced apart in many rows in the longitudinal direction. The plurality of ground plates 100 are connected with one another by the bare copper wire 300 in the heading direction which is equal to the construction direction of the ground plates 100.

In this instance, the bare copper wire 300 is located at the upper ends of the ground plates 100, and is fixed in the adapter holes 111 of the ground plates 100, so that the bare copper wire 300 is connected with the ground plates 100 and the plurality of ground plates 100 are all connected by the bare copper wire 300 located in the same heading direction.

Depending on design conditions, as illustrated in FIG. 18, in the case that the ground plates are respectively laid on the three sides of the excavated space, the ground plates 100 can be connected with each other by the bare copper wire 300.

Additionally, in the case that the three ground plates 100 are constructed in many rows in the longitudinal direction, and all of the three ground plates 100 located in another row can be connected by the bare copper wire 300.

That is, the present invention can be utilized well, since the plurality of ground plates 100 can be selectively connected in parallel or in series by the bare copper wire 300, and show sufficient ground performance since the plurality of ground plates 100 can be constructed even in narrow spaces.

The backfilling step (S24) is a step of filling the excavated space with soil and sand to backfill when laying of the ground plates 100 in the excavated space is finished.

Depending design conditions, in the backfilling step, the excavated space is backfilled with soil (beach mud) or red clay containing salt.

In this instance, soil or red clay containing salt can improve contact performance with the integrated needle-shaped ground plate made of a copper material, and improve ground performance.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the claims.

According to the present invention, the integrated needle-shaped ground plate can provide excellent ground characteristics by improving conductivity and provide convenience in manufacturing and construction since being in an integrated form.

Moreover, the ground plate has adapter holes formed in the front, rear, left and right sides thereof, and a bare copper wire is connected to the adapter holes so that the plurality of ground plates are constructed to be spaced apart from one another. Therefore, the ground plates with improved ground characteristics can be constructed over a wide area.

Furthermore, the present invention can be constructed easily since the plurality of ground plates are spaced apart from one another and bare cooper wire is connected into the adapter holes of the ground plates.

In addition, because the ground plate 100 is perforated to form the through holes, when the ground plate 100 is laid under the ground, earth and sand flow into the through holes, so that a bonded surface area between the ground plate and the ground gets wider and grounded effect is maximized since bonding strength is maintained according to the terrain change.

What is claimed is:

1. A plate-shaped ground plate formed with a copper material, the ground plate comprising:
    an outline frame;
    a plurality of horizontal ribs connecting the left and right inner peripheral surfaces of the outline frame and spaced apart from one another in the vertical direction;
    vertical ribs connecting between the outline frame and the horizontal ribs and between the plurality of horizontal ribs, respectively; and
    branch type needle-shaped protrusions which protrude outwards on the outer peripheral surfaces of the horizontal ribs,
    wherein the plate made of a copper material is partially perforated to form through holes and the horizontal ribs, the vertical ribs and the outline frame are formed by the through holes, and the horizontal ribs and the vertical ribs are formed inside the outline frame to be spaced apart from one another by the through holes, and
    wherein each of the needle-shaped protrusion includes a pair of first protrusions and a pair of second protrusions respectively protruding outwards on the front side and the rear side of the horizontal rib, and a pair of first protrusions and a pair of second protrusions are formed in such a way as become wider as getting away from the horizontal rib, so that the needle-shaped protrusions form an "X" shape.

2. The plate-shaped ground plate according to claim 1, wherein the outline frame has one or more adapter holes formed in the front, rear, right and left sides thereof.

3. The plate-shaped ground plate according to claim 1, wherein at least one selected from a pair of first protrusions and a pair of second protrusions of the needle-shaped protrusion is bent and protrudes upwards or downwards from the ground plate.

4. The plate-shaped ground plate according to claim 1, wherein the vertical ribs are connected between the outline frame and the horizontal rib and between the plurality of horizontal ribs in pairs,
    wherein the vertical rib includes: exterior vertical ribs formed in such a way that an interval between a pair of the vertical ribs is wide and an interval between the outline frame and the vertical rib is narrow; and interior vertical ribs formed in such a way that an interval between a pair of the vertical ribs is narrow and an interval between the outline frame and the vertical rib is wide, and
    wherein the exterior vertical ribs and the interior vertical ribs are repeatedly arranged in the vertical direction of the ground plate in order.

5. A method for manufacturing the integrated needle-shaped ground plate described in claim 1, the method comprising:
    a preparation step of preparing a plate-shaped member by molding a copper material:
    a perforation step of perforating the plate-shaped member using a perforating device to form an outline frame and through holes; and
    a boring step of forming one or more adapter holes in the front, rear, right and left sides of the outline frame,
    wherein in the perforation step, a plurality of horizontal ribs connecting the left and right inner peripheral surfaces of the outline frame are formed to be spaced apart from one another, a plurality of vertical ribs connecting between the outline frame and the horizontal ribs and between the plurality of horizontal ribs are formed, and branch type needle-shaped protrusions are formed on the outer peripheral surfaces of the horizontal ribs to protrude outwards, and
    wherein each of the needle-shaped protrusions includes a pair of first protrusions and a pair of second protrusions respectively protruding outwards on the front side and the rear side of the horizontal rib, and a pair of first protrusions and a pair of second protrusions are formed in such a way as become wider as getting away from the horizontal rib, so that the needle-shaped protrusions form an "X" shape.

6. A ground unit construction method using the integrated needle-shaped ground plate described in claim 1, the method comprising:
    an excavation step of excavating the ground; and
    a laying step of laying ground plates in the excavated space,
    wherein the ground plate comprises:
    an outline frame;
    a plurality of horizontal ribs connecting the left and right inner peripheral surfaces of the outline frame and spaced apart from one another in the vertical direction;
    vertical ribs connecting between the outline frame and the horizontal ribs and between the plurality of horizontal ribs, respectively; and
    branch type needle-shaped protrusions which protrude outwards on the outer peripheral surfaces of the horizontal ribs, wherein the plate made of a copper material is partially perforated to form through holes and the horizontal ribs, the vertical ribs and the outline frame are formed by the through holes, and the horizontal ribs and the vertical ribs are formed inside the outline frame to be spaced apart from one another by the through holes, and wherein each of the needle-shaped protrusion includes a pair of first protrusions and a pair of second protrusions respectively protruding outwards on the front side and the rear side of the horizontal rib, and a pair of first protrusions and a pair of second protrusions are formed in such a way as become wider as getting away from the horizontal rib, so that the needle-shaped protrusions form an "X" shape.

7. The method according to claim 6, further comprising:
a bare copper wire connection step of connecting the plurality of ground plates with one another by a bare copper wire in the heading direction which is equal to the construction direction of the ground plates, after the laying step of laying and constructing the ground plates to be spaced apart in many rows in the longitudinal direction.

8. The method according to claim 7, wherein in the bare copper wire connection step, the bare copper wire is located at the upper end of the plurality of ground plates laid in the same heading direction, and is fixed in adapter holes of the ground plates.

\* \* \* \* \*